US005743137A

United States Patent [19]

Brown et al.

[11] Patent Number: 5,743,137
[45] Date of Patent: Apr. 28, 1998

[54] MAGNETIC FLOAT ASSEMBLY

[75] Inventors: David E. Brown, Strongsville; David E. Purcel, Amherst, both of Ohio

[73] Assignee: Clark-Reliance Corporation, Strongsville, Ohio

[21] Appl. No.: 556,102

[22] Filed: Nov. 9, 1995

[51] Int. Cl.[6] .................................................. G01F 23/76
[52] U.S. Cl. ........................ 73/322.5; 73/319; 73/DIG. 5
[58] Field of Search ...................... 73/314, 319, 322.5, 73/DIG. 5, 321; 335/302, 306; 340/618, 623, 624; 116/204, 228

[56] References Cited

U.S. PATENT DOCUMENTS

| | | | |
|---|---|---|---|
| 1,347,217 | 7/1920 | Engelhard et al. | 73/322.5 |
| 2,456,233 | 12/1948 | Wolf | 73/319 |
| 2,556,346 | 6/1951 | Stromberg | 73/319 |
| 2,598,835 | 6/1952 | Ryan | 73/314 |
| 3,555,905 | 1/1971 | George | 73/321 |
| 3,646,293 | 2/1972 | Howard | 340/618 |
| 3,935,741 | 2/1976 | Zinsmeyer et al. | |
| 3,964,312 | 6/1976 | Sebek | |
| 4,090,050 | 5/1978 | Süberg | 200/84 C |
| 4,194,397 | 3/1980 | Yasuda | |
| 4,457,171 | 7/1984 | Gebauer | |
| 4,466,284 | 8/1984 | Dumery | |
| 4,480,469 | 11/1984 | Tice | |
| 4,483,193 | 11/1984 | Bonetti | |
| 4,512,190 | 4/1985 | Sledmere | 73/319 |
| 4,557,071 | 12/1985 | Fah | |
| 4,589,282 | 5/1986 | Dumery | |
| 4,870,862 | 10/1989 | Bonetti | |
| 4,922,764 | 5/1990 | Welker | 73/DIG. 5 |
| 4,924,703 | 5/1990 | White et al. | |
| 5,020,367 | 6/1991 | White | |
| 5,299,456 | 4/1994 | Steiner | 73/322.5 |

FOREIGN PATENT DOCUMENTS 3433062  3/1986  Germany ........................ 73/322.5

*Primary Examiner*—William A. Cuchlinski, Jr.
*Assistant Examiner*—Andrew Hirshfeld
*Attorney, Agent, or Firm*—Calfee, Halter & Griswold LLP

[57] ABSTRACT

A magnetic float assembly is provided, comprising (i) a generally cylindrical paramagnetic (e.g. stainless steel) float enclosure having first and second closed end portions located at opposite ends of a longitudinal axis running the length thereof, and having a generally cylindrical interior surface located between the end portions, (ii) a first annular magnet disposed within the float enclosure at a first location along the longitudinal axis and having an outer surface which substantially corresponds to the generally cylindrical interior surface, and (iii) and a second annular magnet disposed within the float enclosure at a second location along the longitudinal axis and having an outer surface which substantially corresponds to the generally cylindrical interior surface. The first and second annular magnets are separated by a paramagnetic (e.g. aluminum or titanium) spacer. Ends of the first and second annular magnets facing each other are magnetized in one polarity and ends of the first and second cylindrical magnets facing the end portions of the enclosure are magnetized in an opposite polarity. The magnetic field of an operating pole of the assembly is created by the proximity of like-charged portions of the facing magnets, and is directed radially outward of the longitudinal axis of the float enclosure toward the outside of the enclosure.

18 Claims, 3 Drawing Sheets

MAGNETIC FLOAT ASSEMBLY

FIELD OF THE INVENTION

The present invention relates generally to magnetically actuated fluid level indication systems, and more particularly to a magnetic float assembly for use in such a system.

BACKGROUND OF THE INVENTION

Magnetically actuated fluid level indication devices are known for providing an indication of the level of a fluid in a tank, boiler, drum, or other fluid container. The indication devices generally provide an indication of the fluid level in environments where visual observation may be difficult, impossible or hazardous. By providing a visual indication of the liquid level in the container, it can be monitored and/or adjusted if necessary. Many of these devices are installed in locations where reliability is crucial.

Known magnetically actuatable fluid level indicator systems typically include a magnetic float disposed within a stand-off column mounted vertically to the tank, and a magnetically actuatable indicator device or electronic circuitry mounted externally to the column. An example of such a system is shown in U.S. Pat. No. 4,194,397 to Yasuda, which comprises a magnetic float 30 disposed in a column 20 vertically mounted to a tank A, and a surface indicator 10 mounted on the column and including a plurality of magnetically actuatable rotors 13.

The magnetic float 30 comprises a float body 31 containing a pair of solid cylindrical magnets 32 and 32' which are coupled by a central circular magnetized disc 33. The disc 33 and the facing ends of the cylindrical magnets 32 and 32' are magnetized to one polarity, and the opposite ends of the cylindrical magnets are magnetized to the opposite polarity. The operating magnetic pole 40 of the float 30, which is created by the magnetized polarity of the disc 33 and the like polarities of the facing ends of the cylindrical magnets 32 and 32', is exposed to the lateral side of the float body 31. The magnetized disc 33 resides at the surface level of the liquid in the column 20 when the float 30 is buoyed therein.

The design of the magnet assembly disclosed in U.S. Pat. No. 4,194,397, however, is deficient in that it provides an assembly of a plurality of solid magnet sections (32, 32', 33). In the design of magnetic float assemblies for liquid level indication systems, it is desirable to reduce the weight of the assembly to insure that it floats on the surface of the liquid. Moreover, the disclosed design provides an operating magnetic pole 40, which is created in part by the facing like-charged portions of the cylindrical magnets 32, 32, but which are located well within the interior wall of the float 30. In the design of magnetic float assemblies, it is desirable to direct and focus the magnetic field of the operating pole sufficiently radially outward from the vertical axis of the float column, in order to maximize the responsiveness of magnetically actuatable indicator elements or other associated magnetically responsive electronic circuitry located outside of the column.

It is therefore an object of the present invention to provide a magnetic float assembly, for use in a magnetically actuatable fluid level indicator system, which reduces the complexity of the magnet configuration contained therein, which reduces the weight thereof, and which provides a strong magnetic operating pole for actuating a magnetically actuatable indicator device or other associated electronic circuitry located external of the float assembly.

SUMMARY OF THE INVENTION

A magnetic float assembly is provided comprising a substantially cylindrical paramagnetic float housing having an internal cavity, and a pair of annular magnets disposed within the cavity in spaced apart relationship along the longitudinal axis of the cylindrical float housing. A spacer element or elements is disposed intermediate the pair of annular magnets. The outer perimetric surfaces of the spacer element and the pair of annular magnets each conforms substantially to an inner wall of the float housing defining the internal cavity.

The annular magnets are located in planes which are generally parallel to each other and generally perpendicular to the longitudinal axis. The magnets may be constructed of a suitable ferromagnetic material, such as ALNICO 5 or 8. The magnets are axially magnetized, such that first ends of the pair of annular magnets facing each other are magnetized in one polarity and second ends of the pair of annular magnets opposite the first ends are magnetized in an opposite polarity. The magnetic field of an operating pole of the assembly is created by the proximity of like-charged portions of the facing magnets, and is directed radially outward of the longitudinal axis of the float enclosure toward the outside of the enclosure.

The spacer elements may be constructed of a paramagnetic material, such as titanium or aluminum. The number and thickness of the spacer elements determines the distance separating the annular magnets and hence the strength of the magnetic field of the operating pole.

In an alternative embodiment, the two annular magnets are replaced by a single annular magnet, which is magnetized radially rather than axially.

DETAILED DESCRIPTION OF THE PREFERRED EMBODIMENT

Figure 1:
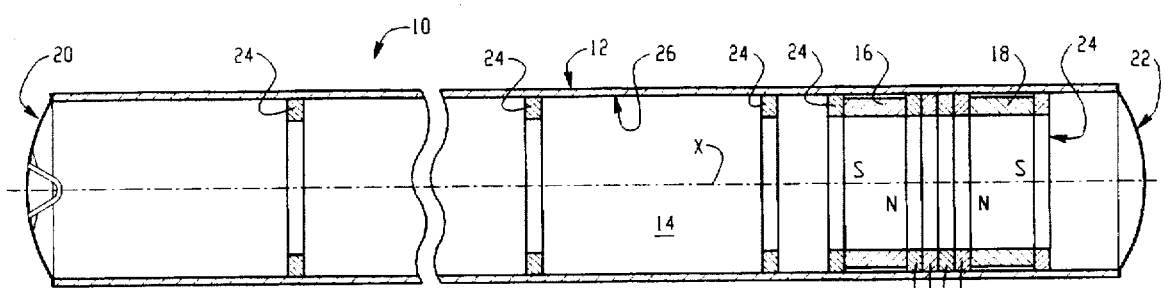
FIG. 1 is a side sectional view of a magnetic float assembly constructed according to the principles of the present invention.

Referring now to the drawings, and initially to FIG. 1, a side sectional view is provided of a magnetic float assembly 10 constructed according to the principles of the present invention. The magnetic float assembly 10 comprises a tubular or cylindrical float enclosure 12 forming a cylindrical cavity 14, centered about longitudinal axis X, which contains a pair of annular magnets 16 and 18. Although the longitudinal axis X is shown horizontally in FIG. 1, the magnetic float assembly 10 is adapted to function in a vertical longitudinal axis orientation within a tank or within a stand-off column mounted vertically to the tank.

The float enclosure 12 is constructed of a paramagnetic, or more commonly called non-magnetic, material such as austenitic stainless steel. The stainless steel, which is permeable to a magnetic field, permits the magnetic field emanating from the magnets to extend to the area outside the enclosure 12. In one embodiment, the stainless steel tube is approximately between ten and twelve inches long and approximately two inches in diameter, although the concept of the present invention may be implemented in magnetic float assemblies of varying dimensions. For example, it is contemplated that the enclosure may be shorter or longer than ten to twelve inches in length, that the enclosure may be constructed from modular tubular portions, or that the enclosure assumes other geometric shapes, such as a sphere or series of interconnected spheres.

The stainless steel enclosure 12 is covered on each of its open ends by stainless steel portions (end caps) 20 and 22. The end caps seal the cavity 14 of the enclosure 12 so as to provide the enclosure with its required buoyancy. The stainless steel end caps may be attached to the enclosure by any suitable means to create a fluid-tight seal. The enclosure is provided with additional rigidity by a plurality of stiffener rings 24 which are installed within the cavity 14 along the axis X adjacent an inner surface 26 of the enclosure. The stiffener rings may be constructed of a suitable material such as aluminum or titanium.

The annular magnets 16 and 18 are constructed of an appropriate ferromagnetic material, such as ALNICO 5 or 8 (a compound of iron, aluminum, nickel and cobalt). The center of each of the annular magnets coincides with the enclosure axis X. As shown in FIG. 1, the magnets are positioned along the axis X near the right side of the Figure. This corresponds to the top of the enclosure 12 when it is floating vertically in a tank or stand-off column.

The outer diameter of each of the annular magnets may be slightly less than the inner diameter of the enclosure 12 to facilitate easy insertion of the magnets into the cavity 14. Stiffener rings 24 located on either side of the magnets, or on one side of the magnet in contact with an end cap, fix the position of the magnets along the longitudinal axis X of the enclosure. However, the gap shown between the magnets and the enclosure inner surface 26 in FIG. 1 may be eliminated by making the outer diameters of the magnets nearly identical to that of the inner diameter of the enclosure. In such a case, the need for stiffener rings on either side of the magnets may be eliminated.

The annular magnets 16, 18 are first cast, and then heat-treated in the presence of a strong magnetic field, to enhance their magnetic permeability, as is known in the art. A subsequent magnetic process then magnetizes the magnets in an axial direction (corresponding to the direction of axis X of the enclosure). Accordingly, the magnets 16, 18 could take the form of a solid disc or a puck, as such a configuration could also be axially magnetized. The magnetized body forming the magnets is characterized by a north pole at one axial end and a south pole at the opposite axial end, due to the magnetization process.

Figure 2:
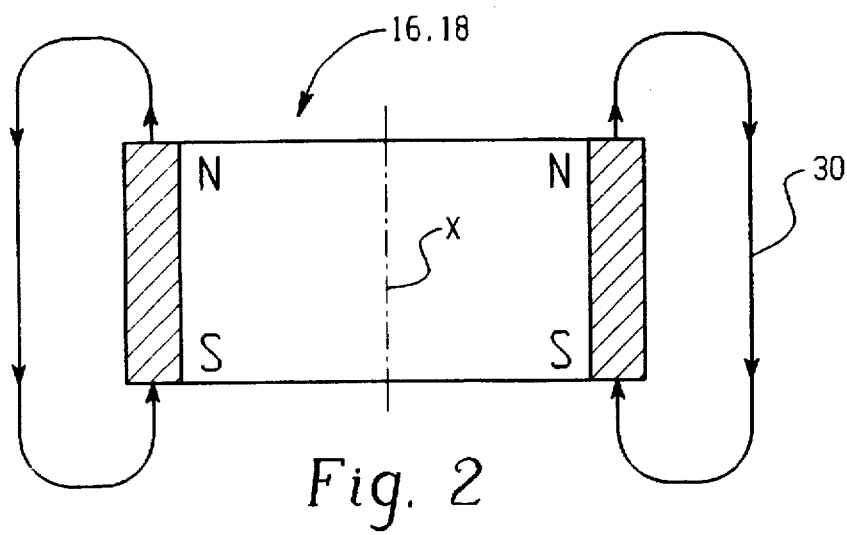
FIG. 2 is a sectional view of either of the two annular magnets shown in the magnetic float assembly of FIG. 1, and the magnetic field characteristics associated with the magnet.

FIG. 2 shows a cross sectional view of what is either of the magnets 16 or 18. As shown in FIG. 2, the top half of the magnet 16, 18, is the north pole and the bottom half of the magnet is the south pole. The magnets 16, 18 are oriented with respect to each other so that like poles face each other (see FIG. 1). The magnetic field emanating from the magnet is represented by field lines 30 (FIG. 2).

As shown in FIG. 1, the permanent magnets 16, 18 are separated from each other along axis X by a distance corresponding to the thickness of a spacer element 34. When installed in a tank or a vertical stand-off column, the assembly floats such that the center of the spacer element corresponds generally to the surface level of the liquid in the tank or column. The spacer element 34 is constructed from a paramagnetic material such as titanium or aluminum. The spacer element 34 may be simply constructed by utilizing a plurality of the stiffener rings 24. In this manner, the thickness of the spacer element may be easily varied.

Figure 3:
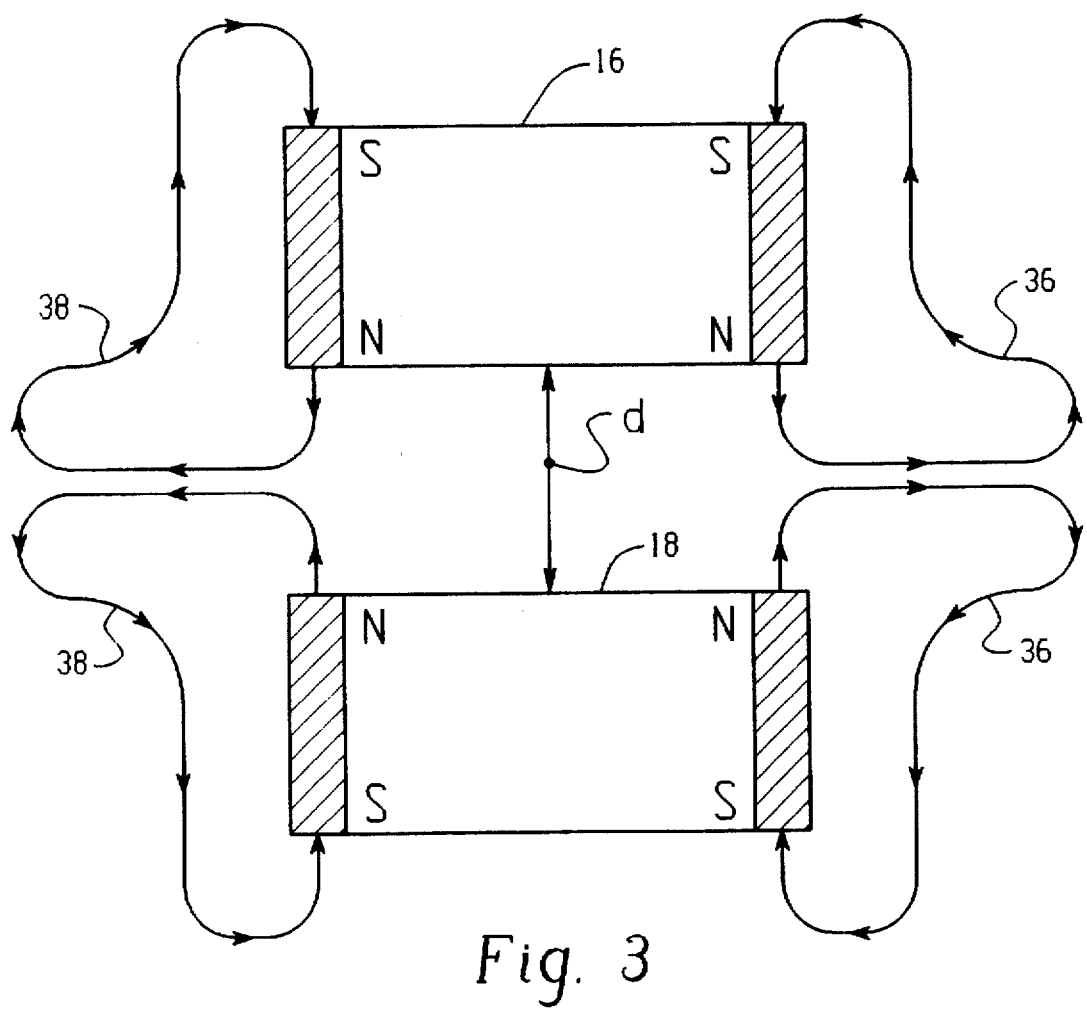
FIG. 3 is a sectional view of both of the annular magnets shown in the magnetic float assembly of FIG. 1, and the combined magnetic field characteristics associated with both magnets when placed in relatively close proximity with each other.

FIG. 3 shows a schematic representation of the orientation of the permanent magnets 16, 18 with respect to each other. The distance d separating the magnets corresponds to the width (axial displacement) of spacer element 34 (FIG. 1). Because the magnets are positioned with like poles facing each other, the magnetic field emanating from each of the like poles repels that emanating from the other, thereby creating a combined magnetic field represented by magnetic field lines 36.

In this manner, an operating pole 38 of the device is created by the combined magnetic fields of each of the facing (north) poles of the magnets 16, 18. This operating pole 38 emanates radially from the axis X, and is represented as a bulge in the magnetic field lines 36. The operating pole serves to actuate a magnetically actuatable indicator device or other associated electronic circuitry located external of the float assembly. The field strength of the operating pole 38 depends upon the individual strengths of the magnets 16 and 18 and the distance d separating the magnets.

The magnetic float assembly 10 constructed according to the teachings herein provides a magnetic field which emanates uniformly axially about the entire 360° circumference of the stainless steel enclosure 12. Accordingly, regardless of the rotational position of the enclosure about axis X, the float assembly will provide a uniform magnetic field for actuating a magnetically actuatable indicator device or other associated electronic circuitry located external of the float assembly.

Figure 4:
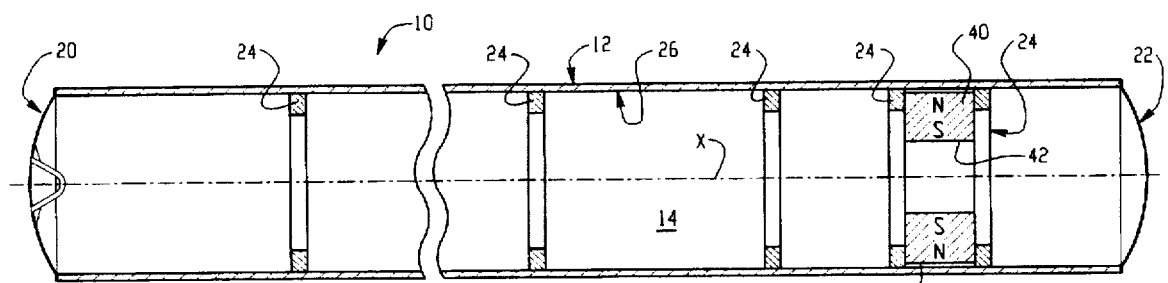
FIG. 4 is a side sectional view of an alterative embodiment of a magnetic float assembly constructed according to the principles of the present invention.

FIG. 4 shows a second embodiment of the present invention, wherein the permanent annular magnets 16 and 18 are replaced with a single annular magnet 40. The magnet 40 is constructed from an appropriate ferromagnetic or ceramic material. The center of the annular magnet 40 coincides with the enclosure axis X.

Because only a singular magnet is utilized in this second embodiment of the invention, the body of the magnet may be more substantial than that of either of the two magnets 16, 18 in the first embodiment. That is, the inner diameter of the magnet 40 is nearer the axis X than the inner diameter of the magnets 16, 18. Like the magnets 16, 18, the magnet 40 is first cast, and then heat-treated in the presence of a strong magnetic field, to enhance its magnetic permeability, as is known in the art.

Figure 5:
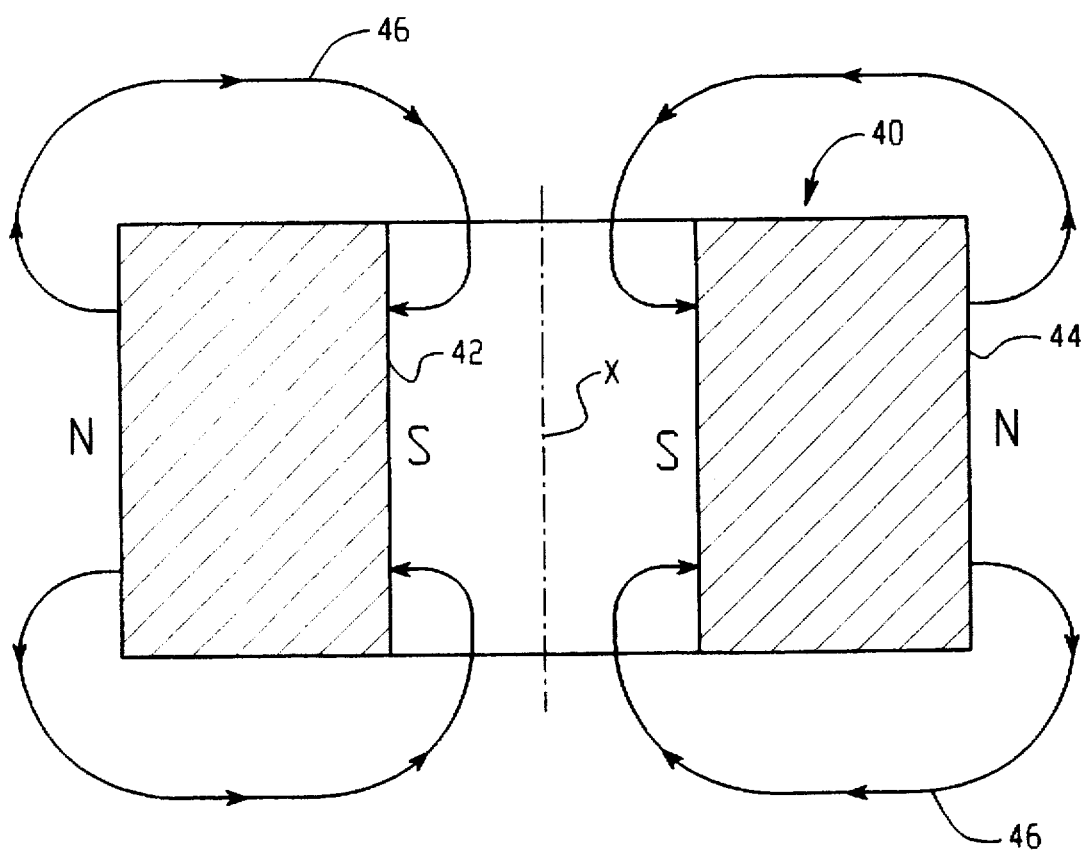
FIG. 5 is a sectional view of the magnet shown in the magnetic float assembly of FIG. 4, and the magnetic field characteristics associated with the magnet.

Unlike the magnets 16, 18 which are axially magnetized with respect to axis X, the singular magnet 40 is then magnetized in a radial direction, such that an inner surface 42 provides one pole of the magnet and an outer surface 44 provides an opposite pole. As shown in FIG. 4, the inner surface 42 represents the south pole of the magnet 40 and the outer surface 44 represents the north pole of the magnet. FIG. 5 shows a cross sectional view of the magnet 40, as well as the magnetic field emanating from the magnet, represented by field lines 46.

Because the body of the single magnet 40 may be substantially greater than that of each of the single magnets 16 and 18, the operating pole of the magnet 40 is provided by the (north) pole represented by the outer surface 44 of the magnet. Whereas the field strength of the operating pole 38 in the first embodiment is dependent upon the individual strengths of the magnets 16 and 18 and the distance d separating the magnets, the field strength of the magnet is dependent only on the characteristics of the magnet 40 itself, and particularly on the dimensional characteristics of the magnet, the materials of which it is constructed, and the degree of magnetization of these materials.

Accordingly, the preferred embodiment of a magnetic float assembly has been described. With the foregoing description in mind, however, it is understood that this description is made only by way of example, that the invention is not limited to the particular embodiments described herein, and that various rearrangements, modifications and substitutions may be implemented without departing from the true scope of the invention as hereinafter defined by the following claims and their equivalents.

We claim:

1. A magnetic float assembly, comprising:

a float enclosure having first and second closed end portions located at opposite ends of an axis running the length thereof, having an interior surface located between said end portions, and having an inner diameter, said float enclosure being constructed from a non-magnetic metallic material;

a first generally annular magnet disposed within said float enclosure at a first location along said axis, having an outer surface which substantially corresponds to said interior surface of said float enclosure, and having an outer diameter that is slightly less than said inner diameter of said float enclosure; and a second generally annular magnet disposed within said float enclosure at a second location along said axis, having an outer surface which substantially corresponds to said interior surface of said float enclosure, and having an outer diameter that is slightly less than said inner diameter of said float enclosure.

2. The magnetic float assembly of claim 1, wherein said first and second annular magnets are separated by a paramagnetic spacer.

3. The magnetic float assembly of claim 1, wherein said float enclosure and said interior surface are generally cylindrical in shape.

4. The magnetic float assembly of claim 3, wherein ends of said first and second annular magnets facing each other are magnetized in one polarity and ends of said first and second annular magnets facing said end portions of said float enclosure are magnetized in an opposite polarity relative to said one polarity.

5. The magnetic float assembly of claim 3, wherein said first and second annular magnets are comprised of a ferromagnetic material.

6. The magnetic float assembly of claim 1, wherein said non-magnetic metallic material of said float enclosure is stainless steel.

7. The magnetic float assembly of claim 1, wherein said outer diameter of said first annular magnet is nearly identical to said inner diameter of said float enclosure, and wherein said outer diameter of said second annular magnet is nearly identical to said inner diameter of said float enclosure.

8. A magnetic float assembly, comprising:

a substantially cylindrical float housing constructed about a longitudinal axis of said float housing, providing an internal cavity and having an inner diameter, wherein said float housing is constructed from a non-magnetic metallic material;

a pair of annular magnets disposed within said cavity in spaced apart relationship along said longitudinal axis, said pair of annular magnets located in planes which are generally parallel to each other and generally perpendicular to said longitudinal axis, each of said pair of annular magnets having an outer diameter that is slightly less than said inner diameter of said float housing; and at least one spacer element disposed intermediate said pair of annular magnets.

9. The magnetic float assembly of claim 8, wherein said at least one spacer element is constructed from a paramagnetic material.

10. The magnetic float assembly of claim 9, wherein outer perimetric surfaces of said at least one spacer element and said pair of annular magnets, respectively, each conforms substantially to an inner wall of said float housing defining said internal cavity.

11. The magnetic float assembly of claim 10, wherein said at least one spacer element comprises a plurality of spacer elements, removal or addition or alteration of the width of any of which alters the spaced apart relationship of said pair of annular magnets.

12. The magnetic float assembly of claim 10, wherein said pair of annular magnets are comprised of a ferromagnetic material.

13. The magnetic float assembly of claim 10, wherein first ends of said pair of annular magnets facing each other are magnetized in one polarity and second ends of said pair of annular magnets opposite said first ends are magnetized in an opposite polarity relative to said one Polarity.

14. The magnetic float assembly of claim 8, wherein said paramagnetic material of said float housing is stainless steel.

15. The magnetic float assembly of claim 8, wherein said outer diameter of each of said pair of annular magnets is nearly identical to said inner diameter of said float housing.

16. A magnetic float assembly for use in a tank containing a liquid, comprising:

an enclosure for floating on the surface of the liquid, said enclosure providing an internal cavity, having a central axis, and having an inner diameter, said enclosure being constructed from a non-magnetic metallic material;

a first generally annular magnet fixedly positioned about said axis within said cavity, said first magnet being axially magnetized so as to provide a north pole and a south pole and having an outer diameter that is slightly less than said inner diameter of said enclosure; and a second generally annular magnet fixedly positioned about said axis a fixed distance from said first magnet, said second magnet being axially magnetized so as to provide a north pole and a south pole and having an outer diameter that is slightly less than said inner diameter of said enclosure, said first and second magnets positioned with respect to each other so that like poles face one another.

17. The magnetic float assembly of claim 16, further comprising a paramagnetic spacer element disposed between said like poles of said first and second magnets.

18. The magnetic float assembly of claim 16, wherein said outer diameter of said first magnet is nearly identical to said inner diameter of said enclosure, and wherein said outer diameter of said second magnet is nearly identical to said inner diameter of said enclosure.

* * * * *